(12) United States Patent
Ryu et al.

(10) Patent No.: US 8,958,801 B2
(45) Date of Patent: Feb. 17, 2015

(54) APPARATUS AND METHOD FOR MANAGING NEIGHBOR LIST IN MOBILE COMMUNICATION SYSTEM

(71) Applicant: Samsung Electronics Co., Ltd, Gyeonggi-do (KR)

(72) Inventors: Yeon-Su Ryu, Gyeonggi-do (KR); Hyon-Goo Kang, Gyeonggi-do (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 123 days.

(21) Appl. No.: 13/679,567

(22) Filed: Nov. 16, 2012

(65) Prior Publication Data

US 2013/0130695 A1 May 23, 2013

(30) Foreign Application Priority Data

Nov. 22, 2011 (KR) ........................ 10-2011-0122163

(51) Int. Cl.
*H04W 36/00* (2009.01)
(52) U.S. Cl.
CPC ................................. *H04W 36/0083* (2013.01)
USPC .......................................... 455/438; 455/436
(58) Field of Classification Search
CPC ...................... H04W 33/0083; H04W 36/0061
USPC ................................................ 455/436–444
See application file for complete search history.

(56) References Cited

U.S. PATENT DOCUMENTS

| | | | |
|---|---|---|---|
| 6,192,246 B1 * | 2/2001 | Satarasinghe | 455/442 |
| 7,013,141 B2 * | 3/2006 | Lindquist et al. | 455/435.1 |
| 7,826,847 B1 * | 11/2010 | Roskowski et al. | 455/436 |
| 7,848,292 B2 * | 12/2010 | Bl et al. | 370/331 |
| 7,904,086 B2 * | 3/2011 | Kundu et al. | 455/436 |
| 8,639,243 B2 * | 1/2014 | Radulescu et al. | 455/434 |
| 2001/0041572 A1 * | 11/2001 | Lundqvist et al. | 455/450 |
| 2004/0157600 A1 * | 8/2004 | Stumpert et al. | 455/432.1 |
| 2004/0235478 A1 * | 11/2004 | Lindquist et al. | 455/440 |
| 2005/0048974 A1 * | 3/2005 | Kim et al. | 455/436 |
| 2008/0167041 A1 * | 7/2008 | Wang et al. | 455/436 |
| 2009/0061871 A1 * | 3/2009 | Gross et al. | 455/436 |
| 2009/0247159 A1 | 10/2009 | Flore et al. | |
| 2010/0240371 A1 * | 9/2010 | Cook et al. | 455/436 |
| 2010/0278161 A1 * | 11/2010 | Ore et al. | 370/338 |
| 2010/0279693 A1 * | 11/2010 | Hole | 455/436 |
| 2012/0282931 A1 * | 11/2012 | Giustina et al. | 455/437 |

FOREIGN PATENT DOCUMENTS

KR 10-2011-0000683 1/2011

* cited by examiner

*Primary Examiner* — Nathan Mitchell (57) ABSTRACT

An apparatus and method for efficiently manage a neighbor cell list in a mobile communication system. A method for operating a base station in a mobile communication system includes generating a neighbor cell list including at least one cell, including at least one cell among the at least one cell in a first list disallowing a handover, and disallowing a handover to the at least one cell included in the first list.

22 Claims, 7 Drawing Sheets

APPARATUS AND METHOD FOR MANAGING NEIGHBOR LIST IN MOBILE COMMUNICATION SYSTEM

CROSS-REFERENCE TO RELATED APPLICATION(S) AND CLAIM OF PRIORITY

The present application is related to and claims priority under 35 U.S.C. §119 to an application filed in the Korean Intellectual Property Office on Nov. 22, 2011 and assigned Serial No. 10-2011-0122163, the contents of which are incorporated herein by reference.

TECHNICAL FIELD OF THE INVENTION

The present disclosure relates generally to a mobile communication system.

BACKGROUND OF THE INVENTION

A mobile communication system includes a plurality of base stations, and each base station provides wireless access to terminals within a limited geographical area. An area covered by each base station is called a cell. In order to secure mobility of a terminal, a terminal moving between cells performs a handover. In this case, each base station may retain information about neighbor cells and provide the information to terminals. The information about neighbor cells includes a list of neighbor cells to which a handover from a relevant cell can be performed.

An LTE (Long Term Evolution) system being the next-generation communication system defines an SON (Self Organizing Network). The SON is a technology that supports self configuration, self optimization, self healing, and the like by applying a concept of artificial intelligence to a base station, thereby increasing the operation efficiency and communication quality of the base station and reducing operation/maintenance costs. An ANR (Auto Neighbor Relation) is a portion of the SON function, which automatically detects a neighbor cell and configures and optimizes an NRT (Neighbor Relation Table). When the ANR function is applied, the base station recognizes a change of installation or elimination of a new cell during an operation and reflects the cell installation or elimination on the NRT, thereby maintaining an optimal NRT.

However, the ANR function has the following problems. First, a delay may occur in the process where addition/deletion of an NR to/from the NRT occurs repeatedly within a short time during an ANR function operation, and thus a handover may fail. When a UE (User equipment) generates a measurement report on a new NR, the ANR function adds a new NR. However, when the NRT is in a size full state, the ANR function selects one of the existing NRs, deletes the selected NR from the NRT, and adds a new NR to the NRT. Thus, when a measurement report of a UE is generated repeatedly in an NRT size full state, the addition/deletion of an NR to/from the NRT is performed repeatedly. Therefore, a delay occurs in the process of adding a new NR, and thus a handover failure probability increases. Second, in handover performance respect, even an invalid NR may remain in the NRT. Even an NR having a low handover success rate may be a handover target of the UE until deletion by an operator, because it exists in the NRT without classification. When the UE attempts a handover to the NR having a low handover success rate, a handover failure probability increases and thus system performance degradation may occur.

What is therefore required is an alternative scheme for efficiently managing a neighbor cell list without the above-described problems.

SUMMARY OF THE INVENTION

To address the above-discussed deficiencies of the prior art, it is a primary object to provide at least the advantages below. Accordingly, an object of the present disclosure is to provide an apparatus and method for managing a neighbor cell list in a mobile communication system.

Another object of the present disclosure is to provide an apparatus and method for managing a neighbor cell list in a mobile communication system by using handover statistical information.

Another object of the present disclosure is to provide an apparatus and method for classifying cells having a poor handover performance among a neighbor cell list in a mobile communication system.

According to an aspect of the present disclosure, a method for operating a base station in a mobile communication system includes: generating a neighbor cell list including at least one cell; including at least one cell among the at least one cell in a first list disallowing a handover; and disallowing a handover to the at least one cell included in the first list.

According to another aspect of the present disclosure, an apparatus of a base station in a mobile communication system includes: a storage unit for storing a neighbor cell list including at least one cell; and a control unit for including at least one cell among the at least one cell in a first list disallowing a handover, and disallowing a handover to the at least one cell included in the first list.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation: the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present disclosure relates to an apparatus and method for managing a neighbor list in a mobile communication system. Hereinafter, a description will be given of a scheme for managing a neighbor cell list in a mobile communication system according to the present disclosure. Hereinafter, for the convenience of description, the present disclosure uses terms and names defined in the LTE (Long Term Evolution) standard. However, the present disclosure is not limited by the terms and names, and may also be similarly applied to systems based on other standards.

Figure 1:
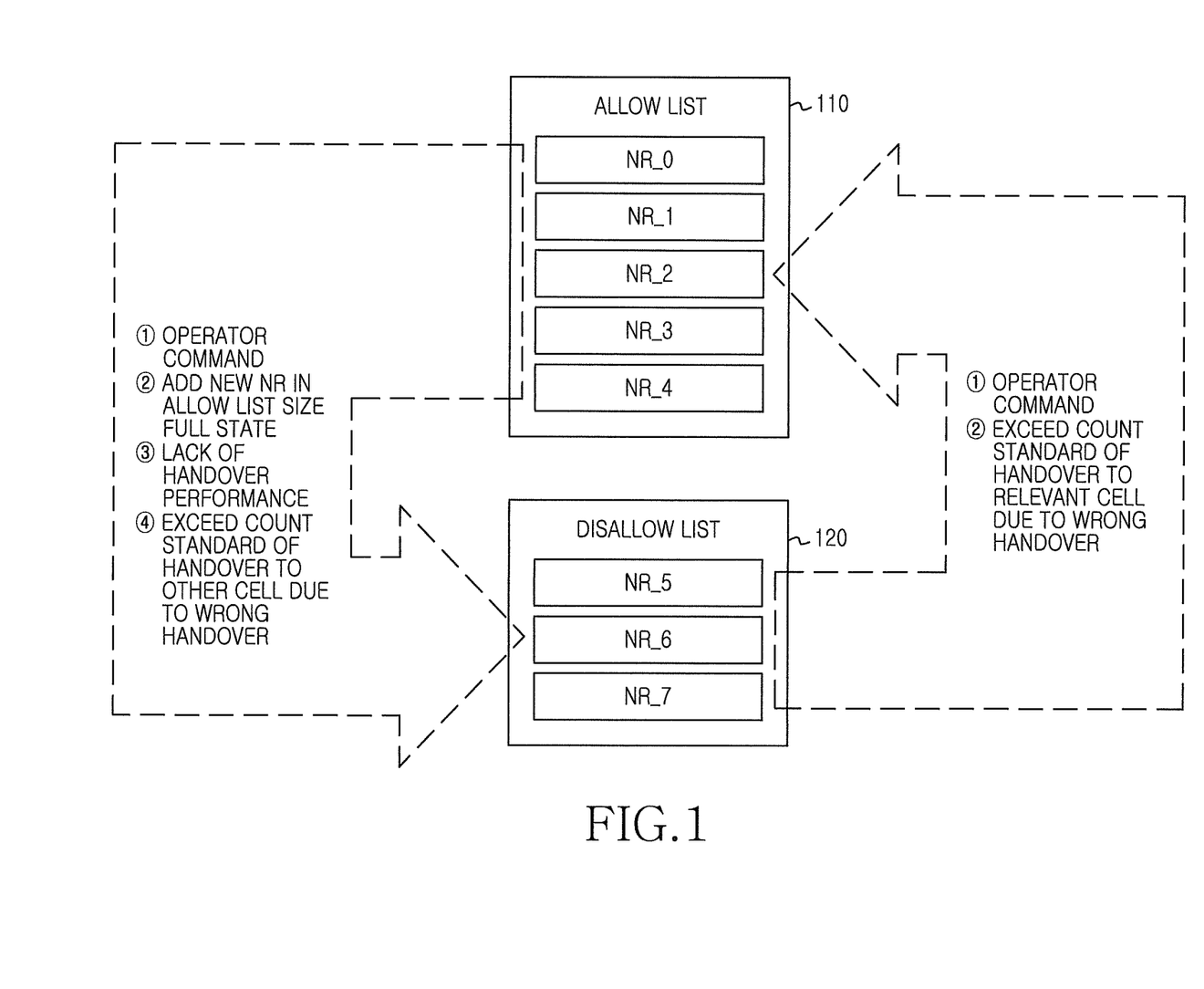
FIG. 1 illustrates an example of a neighbor cell list in a mobile communication system according to an exemplary embodiment of the present disclosure.

FIG. 1 illustrates an example of a neighbor cell list in a mobile communication system according to an exemplary embodiment of the present disclosure.

Referring to FIG. 1, the neighbor cell list includes an allow list 110 and a disallow list 120. The allow list 110 is a set of cells that are allowed to be handed over to the cell, and the disallow list 120 is a set of cells that are not allowed to be handed over to the cell. The allow list 110 may be an NCL (Neighbor Cell List), and the disallow list 120 may be referred to as a black list. NRs (Neighbor Relations) included in the disallow list 120 are not deleted from the NCL, but are not handed over to the cell. Herein, the NRs are information indicating other cells. The allow list 110 and the disallow list 120 may be classified into separate lists on a data structure, or may be implemented by setting a handover allowance parameter, which is added to each NR in one list, to be "true" or "false".

The NRs included in the disallow list 120 may be treated by a base station in the following manner. Even when a terminal transmits a message including identification information of an NR included in the disallow list 120 in order to attempt a handover to a cell, the base station does not allow the handover to the cell. Herein, the identification information may include a PCI (Physical Cell Identifier), and the message may be referred to as an MR (Measurement Report). However, while disallowing the handover, the base station manages cells included in the disallow list 120 as neighbor cells. Specifically, the base station maintains setting of an interface with a base station of the cell included in the disallow list 120, and performs functions performed with the neighbor cells. For example, the functions performed with the neighbor cells may include interference control, Load Balancing (LB), and the like. Herein, the interface may be an X2 interface, and the interference control may be referred to as ICIC (inter-cell interference coordination).

The NRs included in the allow list 110 may be moved to the disallow list 120 by one of predetermined conditions. For example, the predetermined conditions may include at least one of the following, conditions. First, when an operator commands a management system to move a specific NR to the disallow list 120, the specific NR is moved. Second, when a new neighbor cell is detected but the allow list 110 is in a size full state, a lowest-rank NR is moved. Herein, the rank represents the superiority of a handover performance, and may be referred to as ranking. Third, when a specific NR does not satisfy a handover performance standard, the specific NR is moved. Herein, the handover performance standard may include a handover attempt rate, a handover success rate, and the like, and may be referred to as a handover KPI (Key Performance Indicator). Fourth, when a handover to a specific NR is attempted but a handover count to other cells exceeds a threshold value, the specific NR is moved. A situation where a handover to a specific NR is attempted but the handover is performed to other cells may be referred to as a handover to a wrong cell.

Also, the NRs included in the disallow list 120 may be moved to the allow list 110 by one of predetermined conditions. For example, the predetermined conditions may include at least one of the following conditions. First, when the operator commands the management system to exclude a specific NR to the disallow list 120, the specific NR is moved. Second, when a handover to other NRs is attempted but a handover count to a specific NR included in the disallow list 120 exceeds a threshold value, the specific NR is moved. A situation where a handover to other NRs is attempted but the handover is performed to the specific cell may be referred to as a handover to a black cell.

A condition for the NR to move between the allow list 110 and the disallow list 120 will be described in detail below.

A movement to the disallow list 120 due to the size full of the allow list 110 is as follows.

The number of NRs includable in the allow list 110 may be limited. FIG. 1 illustrates an example where the allow list 110 can include up to five NRs. The base station collects handover statistical information about all the NRs included in the neighbor cell list. The handover statistical information may include a handover attempt count, a handover success count, a handover failure count, a handover count to a wrong cell, a handover count of a black cell, and the like. The base station periodically updates a rank of each NR by using the collected handover statistical information. According to an exemplary embodiment of the present disclosure, the rank may be determined as Equation (1).

$$F_i = \omega_1 X_i + \omega_2 Y_i + \omega_3 Z_i \quad (1)$$

In Equation (1), $F_i$ denotes a rank of a cell i, $X_i$ denotes a handover attempt rate of a cell i, which is a ratio of a handover count to the cell i to a total handover count, $\omega_1$ denotes a weight of a handover attempt rate, $Y_i$ denotes a handover success rate, which is a ratio of a handover success count to a cell i to a handover attempt count to the cell i, $\omega_2$ denotes a weight of a handover success rate, $Z_i$ denotes an optional ranking metric, and $\omega_3$ denotes a weight of an optional ranking metric. The optional ranking metric may be defined differently according to specific embodiments.

In this case, when a new neighbor cell is detected, the base station moves a lowest-rank NR to the disallow list 120 and then includes the new neighbor cell to the allow list 110. The new neighbor cell may be detected through a measurement report received from the terminal. For example, when a measurement report including identification information of an undetected cell is received from the terminal accessing the base station, the base station may determine that a new cell is detected.

A movement to the disallow list 120 due to the dissatisfaction of a handover performance standard is as follows.

When the handover statistical information is updated, the base station calculates a handover performance of the NRs included in the neighbor cell list, and determines whether the performance standard is satisfied. In this case, the base station may determine whether the handover performance standard is satisfied with respect to only the NRs included in the allow list 110. When a specific NR does not satisfy the standard, the base station moves the specific NR to the disallow list 120. The handover performance may include a handover success rate and a handover attempt rate. The handover success rate is a ratio of a handover success count to the cell to a handover attempt count to the cell. The handover attempt rate is a ratio of a handover to the cell to all handovers from the cell to other cells. The handover performance standard may be defined by a minimum handover attempt rate, a minimum handover success rate, and the like. Whether the handover performance standard is satisfied may be determined as Equation (2).

$$X_i < X_{LB} \text{ and } Y_i < \beta \times Y_{LB} \qquad (2)$$

In Equation (2), $X_i$ denotes a handover attempt rate of a cell i, $X_{LB}$ denotes a low bound of a handover attempt rate, $Y_i$ denotes a handover success rate of a cell i, $\beta$ denotes a constant of a threshold value of a handover success rate, and $Y_{LB}$ denotes a low bound of a handover success rate.

A movement to the disallow list 120 due to the handover to a wrong cell is as follows.

The handover to a wrong cell means a situation where the terminal accesses a third cell other than a serving cell and a target cell, because an RLF (radio link failure) occurs while the terminal is performing a handover to a neighbor cell or within a short time after completion of the handover. The base station may collect statistical information related to the handover to a wrong cell, through information included in a message received from a neighbor base station. The statistical information related to the handover to a wrong cell may be collected by a call processing software block of the base station. Accordingly, the base station measures a handover occurrence frequency to a wrong cell with respect to each NR included in the neighbor cell list, and moves the NR to the disallow list 120 when the occurrence frequency exceeds a threshold value. The occurrence frequency of the handover to a wrong cell may be determined as Equation (3).

$$R_{Handover\ to\ wrong\ cell} = \frac{N_{Handover\ to\ wrong\ cell}}{\text{Handover count to } cell_i} \qquad (3)$$

In Equation (3), $R_{Handover\ to\ wrong\ cell}$ denotes a handover occurrence rate to a wrong cell, $N_{Handover\ to\ wrong\ cell}$ denotes a handover count to a wrong cell, and Handover count to $cell_i$ denotes a handover attempt count to a cell i.

A movement to the allow list 110 due to the handover to a black cell is as follows.

The handover to a black cell means a situation where the terminal accesses a third cell other than a serving cell and a target cell but the third cell is an NR included in the disallow list 120, because an RLF occurs while the terminal is performing a handover to an NR not included in the disallow list 120 or within a short time after completion of the handover. The base station may collect statistical information related to the handover to a black cell, through information included in a message received from a neighbor base station and a measurement report received from the terminal. The statistical information related to the handover to a black cell may be collected by a call processing software block of the base station. Accordingly, the base station measures a handover occurrence frequency to a black cell with respect to each NR included in the disallow list 120, and moves the NR to the allow list 110 when the occurrence frequency exceeds a threshold value. The occurrence frequency of the handover to a black cell may be determined as Equation (4).

$$R_{Handover\ to\ black\ cell} = \frac{N_{Handover\ to\ black\ cell}}{\sum_{i=1}^{N_{nbr}} \text{Handover count to } cell_i} \qquad (4)$$

In Equation (4), $R_{Handover\ to\ black\ cell}$ denotes a handover occurrence rate to a black cell, $N_{Handover\ to\ black\ cell}$ denotes a handover count to a black cell, $N_{nbr}$ denotes the number of neighbor cells, and Handover count to $cell_i$ denotes a handover attempt count to a cell i.

Hereinafter, an operation and configuration of the base station for managing the neighbor cell list according to the present disclosure as described above will be described in detail with reference to the drawings.

Figure 2:
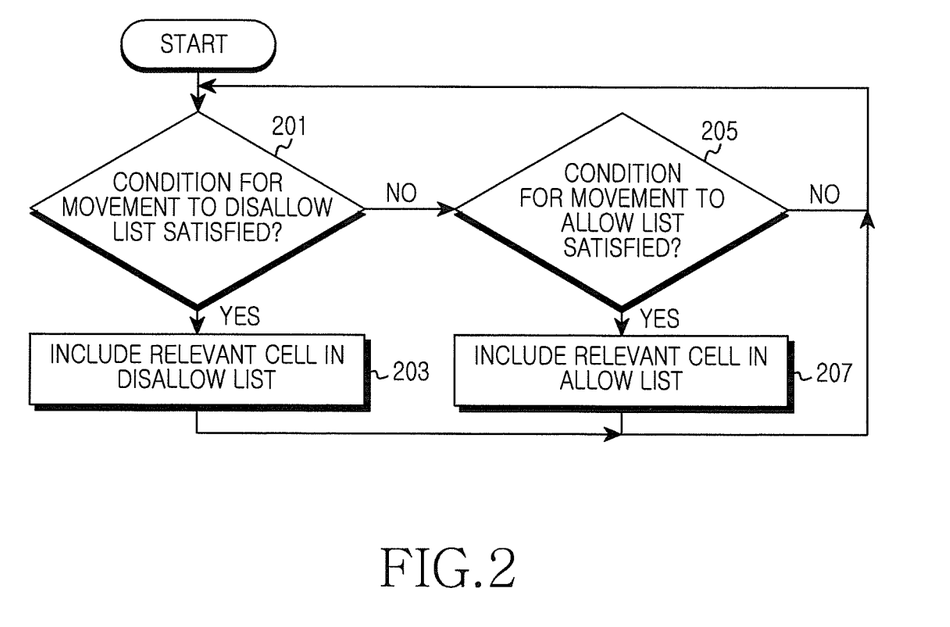
FIG. 2 illustrates a process for operating a base station in a mobile communication system according to an exemplary embodiment of the present disclosure.

FIG. 2 illustrates a process for operating a base station in a mobile communication system according to an exemplary embodiment of the present disclosure.

Referring to FIG. 2, in step 201, the base station determines whether a condition for movement to a disallow list is satisfied. That is, the base station may generate and store a neighbor cell list including at least one cell, and may include at least one of the at least one cell in the disallow list according to a predetermined condition. For example, the condition for movement to the disallow list may include at least one of an operator command, detection of a new cell when an allow list is in a size full state, handover performance degradation, and an increase in the occurrence frequency of a handover to a wrong cell.

When the condition for movement to the disallow list is satisfied, the base station proceeds to step 203. In step 203, the base station includes the cell to the disallow list. The base station may set a handover allowance parameter, which is added to an item of the cell, to be "false"°. For example, when an operator command is generated, the base station moves the cell corresponding to the command to the disallow list. For example, when a new cell is detected in a size full state of the allow list, the base station moves a lowest-rank cell among the cells included in the allow list to the disallow list. For example, when a handover performance degrades below a standard, the base station moves the cell with a degraded handover performance to the disallow list. For example, when the occurrence frequency of a handover to a wrong cell increases, the base station moves the cell as a target for the handover to the disallow list.

When the condition for movement to the disallow list is not satisfied, the base station proceeds to step 205. In step 205, the base station determines whether a condition for movement to the allow list is satisfied. That is, the base station may generate and store a neighbor cell list including at least one cell, and may include at least one of the at least one cell in the allow list according to a predetermined condition. For example, the condition for movement to the allow list may include at least one of an operator command and an increase in the occurrence frequency of a handover to a black cell.

When the condition for movement to the allow list is satisfied, the base station proceeds to step 207. In step 207, the base station includes the cell to the allow list. The base station may set a handover allowance parameter, which is added to an item of the cell, to be "true". For example, when an operator command is generated, the base station moves the cell corresponding to the command to the allow list. For example, when the occurrence frequency of a handover to a black cell increases, the base station moves the cell accessed by the terminal as a result of the handover to the allow list.

Figure 3:
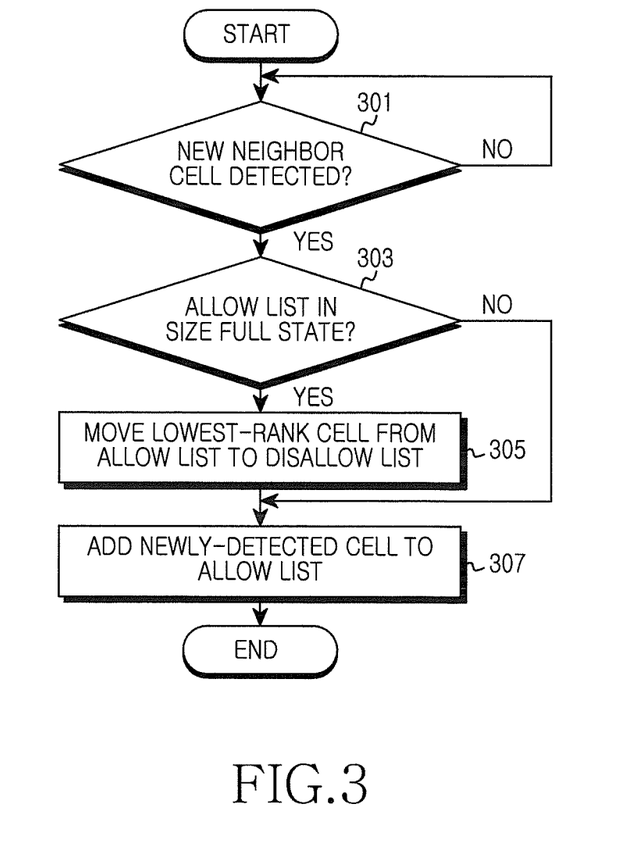
FIG. 3 illustrates a process for managing a neighbor cell list according to detection of a new neighbor cell in a mobile communication system according to an exemplary embodiment of the present disclosure.

FIG. 3 illustrates a process for managing a neighbor cell list according to detection of a new neighbor cell in a mobile communication system according to an exemplary embodiment of the present disclosure.

Referring to FIG. 3, in step 301, a base station determines whether a new neighbor cell is detected. The new neighbor cell may be detected through a measurement report received from a terminal. For example, when a measurement report including identification information of an undetected cell is received from the terminal accessing the base station, the base station may determine that a new cell is detected.

When the new neighbor cell is detected, the base station proceeds to step 303. In step 303, the base station determined whether an allow list in a neighbor cell list is in a size full state. That is, the number of cells includable in the allow list is limited. When the allow list is not in a size full state, that is, when a cell can be added to the allow list, the base station skips step 305.

On the other hand, when the allow list is in a size full state, the base station proceeds to step 305. In step 305, the base station moves a lowest-rank cell in the allow list to a disallow list. The rank is determined by using handover statistics, and represents a superiority of a handover performance. Although not illustrated in FIG. 3, the base station periodically updates the rank of the cells included in the allow list. For example, the rank may be determined as Equation (1).

Thereafter, in step 307, the base station adds the new neighbor cell to the allow list. In this case, the new neighbor cell may be given the lowest rank in the allow list. Alternatively, until arrival of a next rank determination period, the new neighbor cell may not be given a rank.

Figure 4:
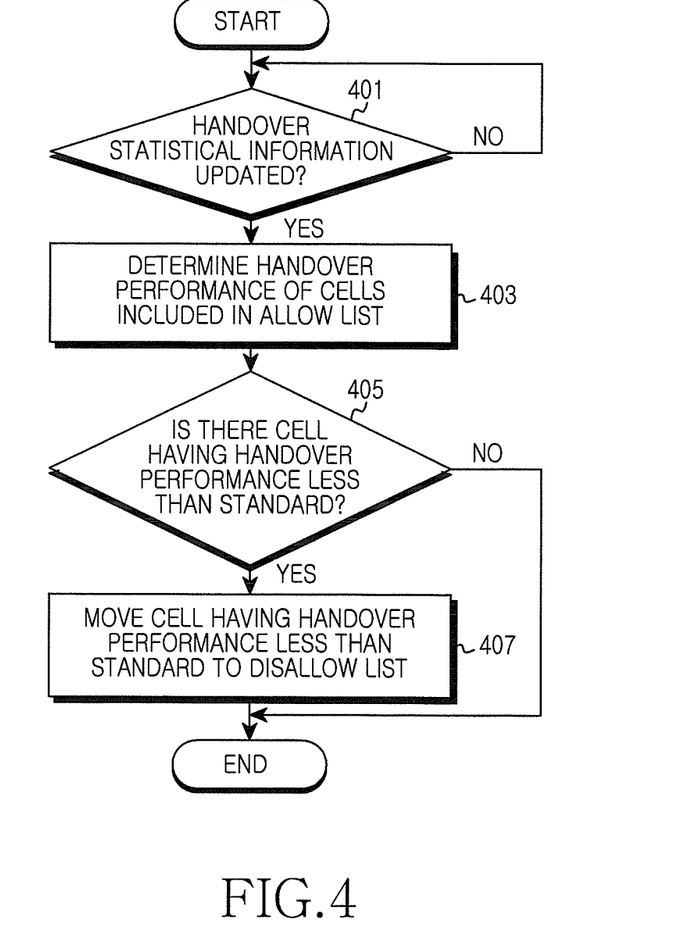
FIG. 4 illustrates a process for managing a neighbor cell list according to a handover performance in a mobile communication system according to an exemplary embodiment of the present disclosure.

FIG. 4 illustrates a process for managing a neighbor cell list according to a handover performance in a mobile communication system according to an exemplary embodiment of the present disclosure.

Referring to FIG. 4, in step 401, a base station determines whether handover statistical information is updated. The handover statistical information may include a handover attempt count, a handover success count, a handover failure count, a handover count to a wrong cell, a handover count of a black cell, and the like. For example, the base station may collect statistical information related to the handover to a wrong cell, through information included in a message received from a neighbor base station.

When the handover statistical information is updated, the base station proceeds to step 403. In step 403, the base station determines a handover performance of the cells included in an allow list. For example, the handover performance may include a handover success rate and a handover attempt rate. Specifically, the handover success rate is a ratio of a handover success count to the cell to a handover attempt count to the cell, and the handover attempt rate is a ratio of a handover to the cell to all handovers from the cell to other cells.

Thereafter, in step 405, the base station determines whether there is at least one cell having a handover performance less than a standard. The handover performance standard may be defined by a minimum handover attempt rate, a minimum handover success rate, and the like. For example, the base station may determine whether the handover performance standard is satisfied, as Equation (2).

When there is at least one cell having a handover performance less than the standard, the base station proceeds to step 407. In step 407, the base station moves the cell having a handover performance less than the standard to a disallow list. That is, since there is a high possibility that a handover attempt to the cell having a handover performance less than the standard will fail, the base station disallows a handover to the cell having a handover performance less than the standard.

Figure 5:
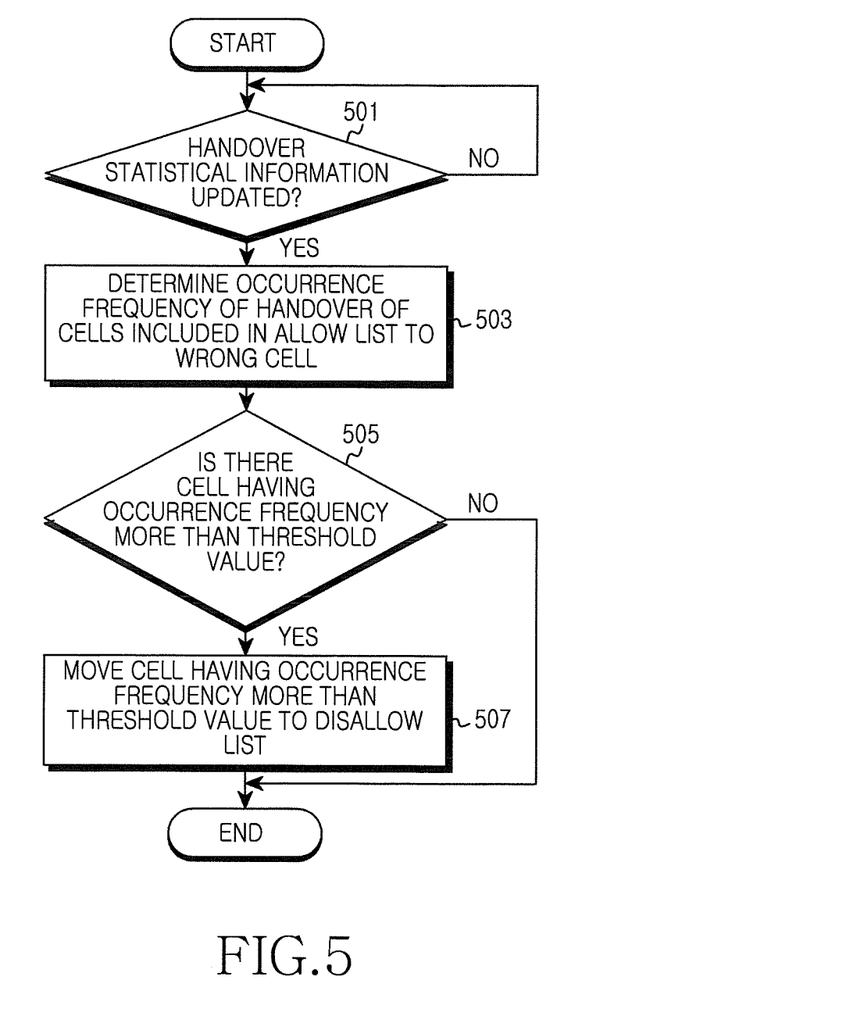
FIG. 5 illustrates a process for managing a neighbor cell list according to a handover to a wrong cell in a mobile communication system according to an exemplary embodiment of the present disclosure.

FIG. 5 illustrates a process for managing a neighbor cell list according to a handover to a wrong cell in a mobile communication system according to an exemplary embodiment of the present disclosure.

Referring to FIG. 5, in step 501, a base station determines whether handover statistical information is updated. The handover statistical information may include a handover attempt count, a handover success count, a handover failure count, a handover count to a wrong cell, a handover count of a black cell, and the like. For example, the base station may collect statistical information related to the handover to a wrong cell, through information included in a message received from a neighbor base station.

When the handover statistical information is updated, the base station proceeds to step 503. In step 503, the base station determines a handover occurrence frequency of the cells included in an allow list to a wrong cell. The handover to a wrong cell means a case where the handover is performed to a third cell other than a serving cell and a target cell. For example, the base station may determine the handover occurrence frequency to a wrong cell as Equation (3).

Thereafter, in step 505, the base station determines whether there is at least one cell having the handover occurrence frequency to a wrong cell more than a threshold value. When there is no cell having the handover occurrence frequency to a wrong cell more than the threshold value, the base station ends the process. Thereafter, when the handover statistical information is updated again, the base station restarts the process.

On the other hand, when there is at least one cell having the handover occurrence frequency to a wrong cell more than the threshold value, the base station proceeds to step 507. In step 507, the base station moves the at least one cell having the handover occurrence frequency to a wrong cell more than the threshold value to a disallow list. That is, since there is a high possibility that a handover attempt to the cell having the handover occurrence frequency to a wrong cell more than the threshold value will fail, the base station disallows a handover to the cell having the handover occurrence frequency to a wrong cell more than the threshold value.

Figure 6:
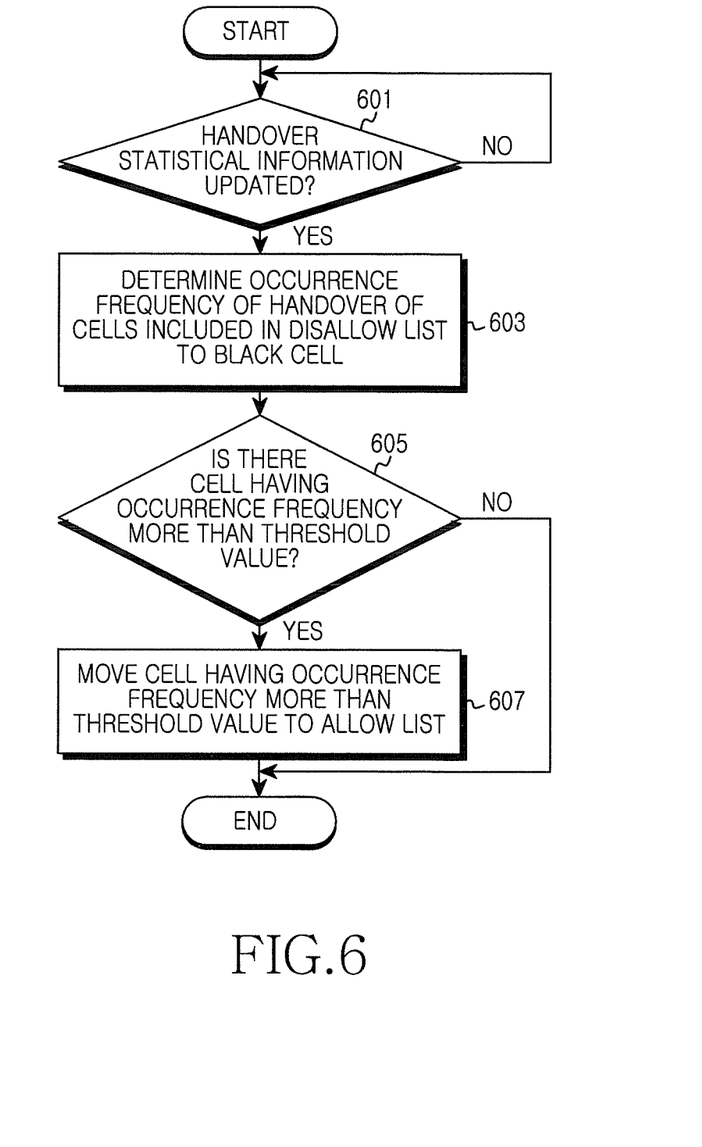
FIG. 6 illustrates a process for managing a neighbor cell list according to a handover to a black cell in a mobile communication system according to an exemplary embodiment of the present disclosure.

FIG. 6 illustrates a process for managing a neighbor cell list according to a handover to a black cell in a mobile communication system according to an exemplary embodiment of the present disclosure.

Referring to FIG. 6, in step 601, a base station determines whether handover statistical information is updated. The handover statistical information may include a handover attempt count, a handover success count, a handover failure count, a handover count to a wrong cell, a handover count of a black cell, and the like. For example, the base station may collect statistical information related to the handover to a wrong cell, through information included in a message received from a neighbor base station.

When the handover statistical information is updated, the base station proceeds to step 603. In step 603, the base station determines a handover occurrence frequency of the cells included in an allow list to a black cell. The handover to a black cell means a case where the handover is performed to a cell included in the disallow list (e.g., a black listed cell), other than a serving cell and a target cell. For example, the base station may determine the handover occurrence frequency to a black cell as Equation (4).

Thereafter, in step 605, the base station determines whether there is at least one cell having the handover occurrence frequency to a black cell more than a threshold value. When there is no cell having the handover occurrence frequency to a black cell more than the threshold value, the base station ends the process. Thereafter, when the handover statistical information is updated again, the base station restarts the process.

On the other hand, when there is at least one cell having the handover occurrence frequency to a black cell more than the threshold value, the base station proceeds to step 607. In step 607, the base station moves the at least one cell having the handover occurrence frequency to a black cell more than the threshold value to an allow list. That is, the frequent performance of an unintended handover to a cell included in the disallow list means that a handover success rate to the cell is high. Accordingly, the base station allows a handover to the cell having the handover occurrence frequency to a black cell more than the threshold value.

Figure 7:
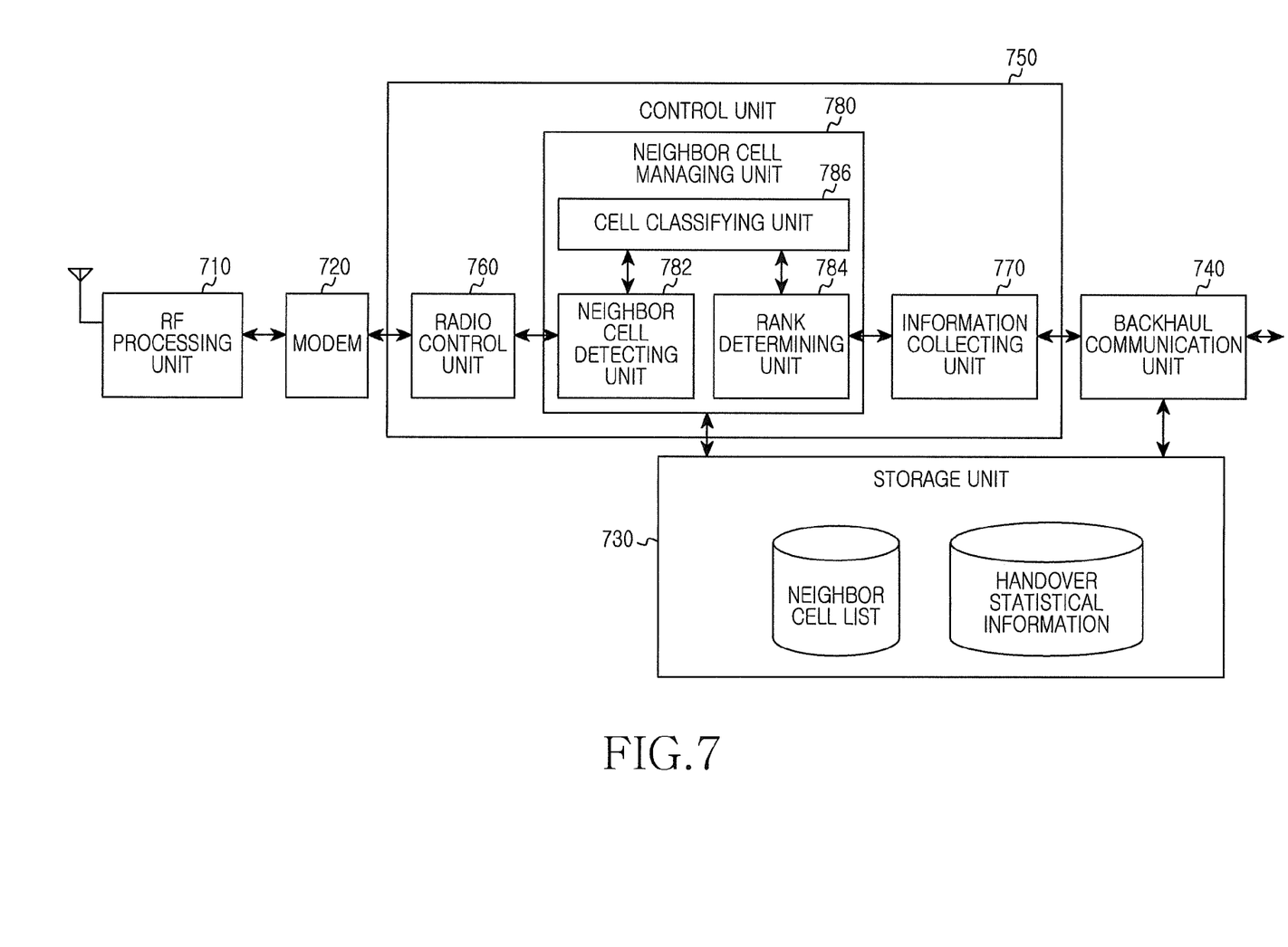
FIG. 7 illustrates a block diagram of a base station in a mobile communication system according to an exemplary embodiment of the present disclosure.

FIG. 7 illustrates a block configuration of a base station in a mobile communication system according to an exemplary embodiment of the present disclosure.

Referring to FIG. 7, the base station includes an RF (Radio Frequency) processing unit 710, a modem 720, a storage unit 730, a backhaul communication unit 740, and a control unit 750.

The RF processing unit 710 performs functions for transmitting/receiving signals through radio channels, such as signal band conversion and amplification. That is, the RF processing unit 710 up-converts a baseband signal received from the modem 720 into an RF signal and transmits the RF signal through an antenna. The RF processing unit 710 down-converts an RF signal received through the antenna into a baseband signal. For example, the RF processing unit 710 may include an amplifier, a mixer, an oscillator, a digital-to-analog converter (DAC), an analog-to-digital converter (ADC), and the like.

The modem 720 performs conversion between a baseband signal and a bitstream according to a physical layer standard of the system. For example, according to an OFDM (Orthogonal Frequency Division Multiplexing) scheme, in a data transmission mode, the modem 720 generates complex symbols by encoding/modulating a TX bitstream, maps the complex symbols to subcarriers, and generates OFDM symbols by Inverse Fast Fourier Transform (IFFT) operation and Cyclic Prefix (CP) insertion. Also, in a data reception mode, the modem 720 divides a baseband signal received from the RF processing unit 710 into OFDM symbols, restores signals mapped to subcarriers by Fast Fourier Transform (FFT) operation, and restores a received bitstream by demodulation and decoding.

The backhaul communication unit 740 provides an interface for the base station to perform communication with other base stations and an upper node. That is, the backhaul communication unit 740 converts a bitstream transmitted from the base station to other node into a physical signal, and converts a physical signal received from the other node into a bitstream. The storage unit 730 stores a basic program for operation of the base station and data such as setting information. The storage unit 730 provides the stored data at the request of the control unit 750. Specifically, the storage unit 730 stores a neighbor cell list managed by the control unit 750, and handover statistical information collected/updated by the control unit 750.

The control unit 750 controls an overall operation of the base station. For example, the control unit 750 generates a TX traffic packet and message and provides the same to the modem 720, and interprets an RX traffic packet and message received from the modem 720. Specifically, the control unit 750 includes a radio control unit 760 for controlling a radio link and interpreting a measurement report received from a terminal, an information collecting unit 770 for collecting handover statistical information from other base stations and an upper node through the backhaul communication unit 740, and a neighbor cell managing unit 780 for managing a neighbor cell list.

The control unit 750 performs at least one of interference control and load balancing on the cells included in the neighbor cell list, regardless of an allow list and a disallow list. According to an exemplary embodiment of the present disclosure, the neighbor cell managing unit 780 classifies the cells included in the neighbor cell list into an allow list and a disallow list. For example, the neighbor cell managing unit 780 may manage the neighbor cell list stored in the storage unit 730, according to the processes illustrated in FIGS. 2 to 6.

The neighbor cell managing unit 780 includes a neighbor cell detecting unit 782, a rank determining unit 784, and a cell classifying unit 786. The rank determining unit 784 determines the ranks of the cells included in the allow list by using the handover statistical information. The neighbor cell detecting unit 782 detects a new neighbor cell by using the measurement report from terminals interpreted by the radio control unit 760. The cell classifying unit 786 updates the allow list and the disallow list by using the rank determined by the rank determining unit 784 and the new neighbor cell information detected by the neighbor cell detecting unit 782.

Also, the cell classifying unit 786 uses the handover statistical information collected by the information collecting unit 770, to determine the handover performance of the cells included in the allow list, the handover occurrence frequency of the cells included in the allow list to a wrong cell, and the handover occurrence frequency of the cells included in the disallow list to a black cell, and update the allow list and the disallow list. Also, the cell classifying unit 786 updates the allow list and the disallow list according to an operator command received from a management system.

Embodiments of the present invention according to the claims and description in the specification can be realized in the form of hardware, software or a combination of hardware and software.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

A neighbor cell invalid in handover performance respect in the mobile communication system is excluded from a handover target. Accordingly, the handover success rate can be improved, and the service quality can be improved. In this case, since the neighbor cell is maintained to be treated as the neighbor cell while being excluded from the handover target, processes such as interference control and load balancing can be maintained.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for operating a base station in a mobile communication system, the method comprising:
    generating a first list including one or more neighbor cells;
    adding a second cell to the first list based on an occurrence frequency of a situation where a terminal accesses a wrong cell when the terminal attempts a handover from a first cell of the base station to the second cell; and
    disallowing a handover to the one or more neighbor cells included in the first list.

2. The method of claim 1, further comprising:
    in response to detecting a new neighbor cell while a second list allowing a handover is in a size full state, adding a cell having a lowest rank in the second list to the first list.

3. The method of claim 2, wherein the rank is determined according to at least one of a ratio of a handover success count to the cell to a handover attempt count to the cell, and a ratio of a handover to the cell to all handovers from the cell to other cells.

4. The method of claim 1, further comprising:
    in response to a handover performance of a cell included in a second list allowing a handover being less than a standard, moving the cell to the first list.

5. The method of claim 4, wherein the handover performance is determined according to at least one of a ratio of a handover success count to the cell to a handover attempt count to the cell, and a ratio of a handover to the cell to all handovers from the cell to other cells.

6. The method of claim 1, wherein adding the second cell to the first list comprises:
    when the occurrence frequency of a situation where the terminal accesses a wrong cell is greater than a threshold value when the terminal attempts a handover from the first cell of the base station to the second cell, adding the second cell to the first list.

7. The method of claim 1, further comprising:
    adding a cell indicated by an operator command to the first list.

8. The method of claim 1, further comprising:
    adding the at least one cell included in the first list to a second list allowing the handover.

9. The method of claim 8, wherein adding the at least one cell in the second list comprises:
    when a terminal attempts a handover from a first cell of the base station to a second cell of another base station but a frequency of occurrence of the terminal accessing a third cell included in the first list, other than the first cell and the second cell, is more than a threshold value, adding the third cell to the second list.

10. The method of claim 8, wherein adding the at least one cell in the second list comprises:
    adding a cell indicated by an operator command to the second list.

11. The method of claim 1, further comprising:
    performing at least one of interference control and load balancing on the at least one cell included in the first list.

12. An apparatus of a base station in a mobile communication system, the apparatus comprising:
    a storage unit configured to store a first list and a second list including one or more neighbor cells; and
    a control unit configured to add a second cell to the second list based on an occurrence frequency of a situation where a terminal accesses a wrong cell when the terminal attempts a handover from a first cell of the base station to the second cell, and disallow a handover to the one or more neighbor cells included in the first list.

13. The apparatus of claim 12, wherein in response to detection of a new neighbor cell while the second list allowing a handover is in a size full state, the control unit is configured to add a cell having a lowest rank in the second list to the first list.

14. The apparatus of claim 13, wherein the rank is determined according to at least one of a ratio of a handover success count to the cell to a handover attempt count to the cell, and a ratio of a handover to the cell to all handovers from the cell to other cells.

15. The apparatus of claim 12, wherein in response to a handover performance of a cell included in the second list allowing a handover being less than a standard, the control unit is configured to add the cell to the first list.

16. The apparatus of claim 15, wherein the handover performance is determined according to at least one of a ratio of a handover success count to the cell to a handover attempt count to the cell, and a ratio of a handover to the cell to all handovers from the cell to other cells.

17. The apparatus of claim 12, wherein when the occurrence frequency of a situation where the terminal accesses a wrong cell is greater than a threshold value when the terminal attempts a handover from the first cell of the base station to the second cell, the control unit is configured to add the second cell to the first list.

18. The apparatus of claim 12, wherein the control unit is configured to add a cell indicated by an operator command to the first list.

19. The apparatus of claim 12, wherein the control unit is configured to add the at least one cell included in the first list to the second list allowing the handover.

20. The apparatus of claim 19, wherein when a terminal attempts a handover from a first cell of the base station to a second cell of another base station but a frequency of occurrence of the terminal accessing a third cell included in the first list, other than the first cell and the second cell, is greater than a threshold value, the control unit is configured to add the third cell to the second list.

21. The apparatus of claim 19, wherein the control unit is configured to add a cell indicated by an operator command to the second list.

22. The apparatus of claim 12, wherein the control unit is configured to perform at least one of interference control and load balancing on the at least one cell included in the first list.

* * * * *